United States Patent [19]

Krämer et al.

[11] 4,163,012

[45] Jul. 31, 1979

[54] PROCESS FOR THE PREPARATION OF CONCENTRATED DYESTUFF SOLUTIONS

[75] Inventors: Erich Krämer; Horst Nickel, both of Leverkusen; Fritz Puchner, Cologne, all of Fed. Rep. of Germany

[73] Assignee: Bayer Aktiengesellschaft, Leverkusen, Fed. Rep. of Germany

[21] Appl. No.: 626,477

[22] Filed: Oct. 28, 1975

[30] Foreign Application Priority Data

Oct. 29, 1974 [DE] Fed. Rep. of Germany ....... 2451257

[51] Int. Cl.$^2$ ...................... C09B 35/16; C09B 41/00
[52] U.S. Cl. ...................................... 260/182; 260/157; 260/163; 260/174; 260/175; 260/177; 260/178; 260/179; 260/180; 260/181; 260/183; 260/184; 260/197; 260/198; 260/199; 260/208
[58] Field of Search ............... 260/177, 178, 179, 180, 260/181, 182, 183, 174, 175, 163, 157, 146 R, 184, 199, 208

[56] References Cited

U.S. PATENT DOCUMENTS

| | | | |
|---|---|---|---|
| 2,424,066 | 7/1947 | Straub et al. ......................... | 260/182 |
| 2,793,205 | 5/1957 | Riat ..................................... | 260/182 |
| 2,885,391 | 5/1959 | Huss et al. ......................... | 260/180 X |
| 3,956,271 | 5/1976 | Blass et al. ........................... | 260/208 |
| 4,035,350 | 7/1977 | Landler et al. ................... | 260/182 X |

OTHER PUBLICATIONS

Fierz-David et al., *Fundamental Processes of Dye Chemistry*, Interscience Publishers, Inc.: New York, 1949, pp. 31-32 & 80-85.
Durrant et al., *Introduction to Advanced Inorganic Chemistry*, John Wiley & Sons, Inc.: New York, 2nd Ed., 1970, p. 650.

*Primary Examiner*—Charles F. Warren
*Attorney, Agent, or Firm*—Plumley & Tyner

[57] ABSTRACT

The invention relates to the preparation of concentrated solutions of azo dyestuffs containing ionic groups, by precipitating during the diazotization and/or coupling reaction and/or after the coupling reaction the foreign ions which lower the solubility of the dyestuffs and separating off these ions as sparingly soluble salts.

In this way dyestuff solutions which are stable to storage at room temperature and have a dyestuff content of 10 to 50 percent by weight are obtained.

2 Claims, No Drawings

PROCESS FOR THE PREPARATION OF CONCENTRATED DYESTUFF SOLUTIONS

The subject of the invention is a process for the preparation of concentrated aqueous or aqueous-organic solutions, of low electrolyte content, of azo dyestuffs containing ionic groups, by diazotisation and coupling.

The process is characterised in that during the diazotisation and/or coupling reaction and/or after the coupling reaction the foreign ions which lower the solubility of the dyestuffs are precipitated from the reaction mixture, and separated off, as sparingly soluble salts.

If desired, it is possible to dilute the solution thus obtained or to concentrate it, for example by evaporation, and/or to add agents which improve the solubility of the dyestuffs.

In this way it proves possible to prepare dyestuff solutions which are stable to storage at room temperature and have a dyestuff content of 10 to 50 per cent by weight.

The new process can be carried out in a great diversity of variants.

One variant (A) is characterised in that the diazotisation is carried out by means of nitrites of which the cations form a salt which is sparingly soluble in water with the anions of the acid used to liberate the nitrous acid, and that this salt is separated off before or after the coupling. The anion belonging to the diazonium cation can—with the exception of diazonium-betaines—be identical with that of the acid employed and, in combination with the cation of the base employed as coupling accelerator, does not influence, or does not significantly influence, the solubility of the dyestuff.

A particular embodiment of this variant is that the salt of the aromatic amine (of the diazo component), of which the anion in combination with the cation of the base employed as coupling accelerator does not impair, or does not significantly impair, the solubility of the resulting dyestuff, is diazotised with a nitrite in the presence of the amount, equivalent to the liberation of $HNO_2$, of an acid which forms a sparingly soluble salt with the nitrite cation, this salt is separated off and the resulting diazonium salt solution is combined with the coupling component in the usual manner. The removal of the sparingly soluble salt can also be carried out after the coupling reaction.

The dyestuff solutions thus obtained are practically free from the cations of the nitrite employed, which adversely influence the solubility of dyestuffs.

According to another embodiment of the variant (A) described above, the cation of the nitrite used, and the anion of the acid used for the diazotisation, are precipitated practically completely. For this purpose, one equivalent of the aromatic amine which is to be diazotised, in two equivalents of an acid, is mixed under customary conditions with one equivalent of a nitrite of which the cation forms a sparingly soluble salt with the anion of the acid and thereafter the remaining acid anions are removed from the system, during the coupling reaction, by adding a second equivalent of hydroxides or salts of which the cation forms sparingly soluble salts with the anions of the acid employed. If salts are used, their anions must be so chosen that the solubility of the dyestuffs is not influenced, or not influenced significantly, thereby.

A further variant (B) of the process claimed is characterised in that the diazotisation is carried out in the usual manner with sodium nitrite and an acid which has a negative influence on the solubility of the resulting dyestuff and that only during the coupling are the anions of this acid precipitated by adding an equivalent amount of suitable additives, and at times the coupling reaction is thereby also accelerated.

In this way, a dyestuff solution is obtained which, whilst free from objectionable acid anions, still contains the sodium ions of the nitrite. If, for example, in this type of reaction a coupling component is employed in the form of its free sulphonic acid, a solution of the sodium dyestuff salt which is practically free from foreign ions is obtained.

Which of the variants described above are employed in each individual case depends above all on the desired degree of concentration of the dyestuff solution and on the solubility properties of the dyestuff, which can easily be determined by simple preliminary experiments.

The acids which impair the solubility of the dyestuffs which are to be prepared are the acids usually employed in industrial diazotisation reactions, namely hydrochloric acid and inorganic oxygen-acids such as sulphuric acid and phosphoric acid, but also hexafluosilicic acid and perchloric acid, as well as dicarboxylic acids (for example oxalic acid).

Which of the nitrites to be used according to process variant (A) are employed depends naturally on the type of acid with which the diazotisation is carried out.

For example, it is possible to employ calcium nitrite, strontium nitrite or barium nitrite in combination with sulphuric acid, phosphoric acid, hexafluosilicic acid and oxalic, acid. Hexafluosilicic acid can be used for precipitating sodium ions and potassium ions. Potassium ions can furthermore be precipitated with perchloric acid.

Suitable agents which can be employed during the coupling reaction to precipitate objectionable acid ions are, for example, the hydroxides, carbonates, bicarbonates and acetates of Ca, Sr and Ba.

The sparingly soluble salts which have been precipitated are removed by customary methods such as decanting, filtering and centrifuging.

The new process is fundamentally suitable for the preparation of concentrated solutions of all ionic types of azo dyestuff, with dyestuffs containing acid groups (such as carboxyl, sulphonamide, phosphoric acid and above all sulphonic acid groups) being preferred and amongst these monoazo and disazo dyestuffs containing sulphonic acid groups being preferred in their turn.

The nature of the agents which are optionally added, after coupling has been carried out, in order to improve the solubility of the dyestuffs, is naturally determined by the type of dyestuff.

The solubility of cationic dyestuffs can be improved, for example, by adding lower fatty acids (formic acid and acetic acid) or lactic acid.

The solubility of anionic dyestuffs which preferably contain sulphonic acid groups can on the other hand be favourably influenced by the following reagents: hydroxides, carbonates and bicarbonates of lithium, and organic bases.

Suitable organic bases are, above all, amines, preferably those which have been described, for example, in DOS (German Published Specification) No. 2,021,520 (British Patent Specification No. 1,311,836) or in DOS (German Published Specification) No. 2,152,523

(French Patent Specification No. 2,111,628) and which can be characterised by the following formula:

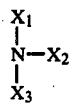

wherein
$X_1$ represents alkyl, hydroxyalkyl, alkoxyalkyl or $-(C_2H_4O)_n-H$,
$X_2$ and $X_3$ represent $X_1$ or H, and $X_1$ and $X_2$ can furthermore, conjointly with the N atom, form a saturated heterocyclic ring, and the alkyl and alkoxy radicals mentioned have 1 to 4 C. atoms, and n represents 2 to 10, preferably 2 to 4, as well as their quaternisation products.

Examples which may be mentioned are ethanolamine, diethanolamine, triethanolamine, tris[2-(2-hydroxyethoxy)-ethyl]-amine, mono-, di- and tri-propanolamine or -isopropanolamine, 2-amino-1,3-propanediol, 2-amino-2-methylol-1,3-propanediol, 2-amino-2-ethyl-1,3-propanediol, D-glycamine, D-glucosamine, tetra[2-(2-hydroxyethoxy)-ethyl]-ammonium hydroxide, ethylenediamine, dimethylethanolamine or diethylethanolamine, β-amino-β'-hydroxy-diethyl ether, morpholine, piperidine and N-hydroxyethylpiperidine.

In the case of particularly readily soluble acid dyestuffs it is also possible to employ, as non-precipitant coupling accelerators, hydroxides, carbonates and bicarbonates of sodium and potassium, these being employed in a way which depends on how the coupling reaction is carried out (say after practically complete removal of the foreign ions, or for the purpose of neutralising free sulphonic acid groups.)

With both types of dyestuff, that is to say both cationic and anionic dyestuffs, the solubility of the dyestuffs in water can at times be improved by adding suitable organic water-miscible solvents and auxiliaries.

Examples of suitable solvents are polyols such as glycols, and polyglycols, their monoalkyl ethers and dialkyl ethers, urea, amides of lower carboxylic acids, as well as lactams and mixtures of the solvents mentioned. Examples which may be mentioned are ethylene glycol, diethylene glycol, ethylene glycol monomethyl ether and monoethyl ether, diethylene glycol monomethyl ether, monoethyl ether, monopropyl ether and monobutyl ether as well as the corresponding dialkyl ethers, acid amides such as formamide, dimethylformamide, pyrrolidone and N-methyl-pyrrolidione, and caprolactam.

The new process is particularly suitable for the preparation of concentrated solutions of dyestuffs of the general formula $$(HO_3S)_n-K-N=N-D-N=N-K'-(SO_3H)_{n'} \qquad I$$

in which
D denotes the radical of a bis-diazo component,
K and K' denote radicals of coupling components,
n and n' denote integers from 0 to 3 and
n+n' is however at least 2.

The process is very particularly suitable for the preparation of concentrated solutions of dyestuffs of the formula

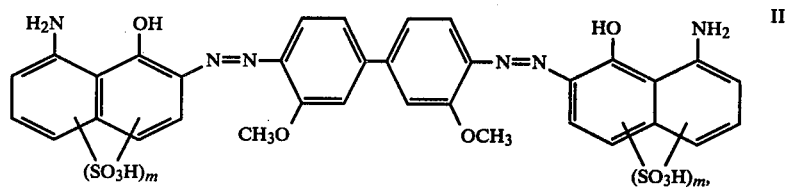

in which m and m' denote the numbers 1 and 2.

Further suitable types of dyestuff to which the process according to the invention can advantageously be applied are those of the formulae $$A-N=N-K-(SO_3H)_n \qquad III$$

in which
A denotes the radical of a diazo component,
K denotes the radical of a coupling component and
n denotes a number from 0 to 3, $$A-N=N-K'-(SO_3H)_p \qquad III\,a$$

in which
A has the meaning mentioned under III,
K' represents the radical of a pyrazolone coupling component and
p denotes a number from 0 to 3,

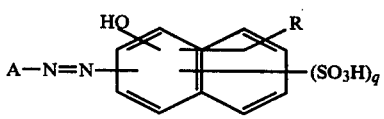

in which
A has the meaning mentioned under III and
R denotes hydrogen, an amino group or an acylamino group and
q denotes a number from 0 to 3,
and

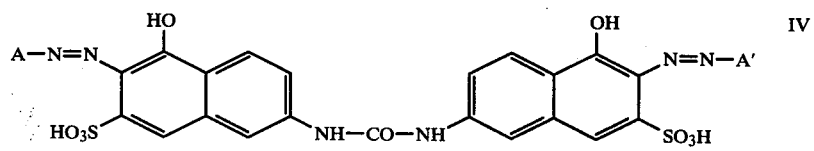

in which A and A' are radicals of diazo components.

The solutions obtainable according to the process of the invention are distinguished by great stability on storage at temperatures of 0 to 40° C., good miscibility with cold and warm water and convenience of use. The solutions of anionic dyestuffs can be used for dyeing the natural and synthetic fibre materials which can be dyed with such types of dyestuff, such as those of wool, silk, leather, high molecular weight polyamides and cellulose, especially paper.

The dyestuff solutions can be added to the paper pulp directly, that is to say without prior dilution.

The solutions of cationic dyestuffs can be used for dyeing acid-modified fibre materials, especially those of polyesters and polyacrylonitrile and paper.

EXAMPLE 1

61 g (0.25 mol) of dianisidine base in 340 ml of water are stirred with 43.3 ml (0.77 mol) of sulphuric acid of 66° Be strength overnight. Next morning, the mixture is cooled to 5°–10° C. by adding about 150 g of ice. 34.5 g (0.5 mol) of sodium nitrite, dissolved in 100 ml of water, are added dropwise over the course of 2 hours. The mixture is stirred for a further hour in the presence of an excess of nitrous acid, which is destroyed with amidosulphonic acid before the solution is used.

42 g (0.75 mol) of calcium oxide are slaked in 370 g of water and cooled to 0° C. 170.5 g (0.5 mol) of the Na₁ salt of 8-amino-1-naphthol-3,6-disulphonic acid (H-acid) are stirred in. After one hour, the mixture is placed in a mixture of ice and sodium chloride, and the above bisdiazotisation product is allowed to run in at a temperature of 0°–5° C. When the pH value of the reaction mixture drops below pH=10, about 19 ml of sodium hydroxide solution (40% strength) are added in such a way that the pH is maintained at 10. When the reaction has ended, the mixture is warmed to 60° C. and is clarified, after cooling, by removing CaSO₄·2H₂O which has precipitated. An approx. 20% strength stable aqueous solution of the tetrasodium dyestuff salt of the following structure is obtained:

sary, a little more hydrochloric acid must be added towards the end of the reaction.

50.8 g (0.2 mol) of 1-(4-sulphophenyl)-3-methyl-pyrazolone-(5) are added to the reaction mixture without having clarified it by removing calcium sulphate, and the whole is brought to pH−4 at 0° C. by adding tris-[2-(2-hydroxy-ethoxy)-ethyl]-amine. This pH value is maintained until the reaction has ended. Further base is then added until the pH assumes a value of 6 (a total of about 110 g). After heating to 60° C. and then cooling to room temperature, the mixture is clarified by removing precipitated CaSO₄·2H₂O and a stable approx. 24% strength solution (expressed as the free dyestuff-acid) of the dyestuff

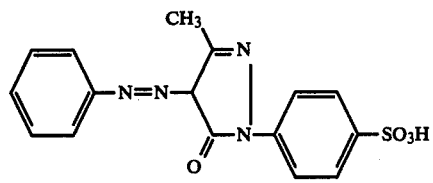

is obtained.

EXAMPLE 4

The procedure followed is as in Example 3 but the sulphuric acid is replaced by 0.1 mol of hexafluosilicic acid and the Ca(NO₂)₂ by 0.2 mol of NaNO₂. The solution of the benzenediazonium chloride is clarified by removing precipitated sodium hexafluosilicate, and is coupled in the manner described. The resulting solution no longer requires clarifying.

EXAMPLE 5

The compounds listed in the table which follows are diazotised and coupled analogously to Example 3 or 4,

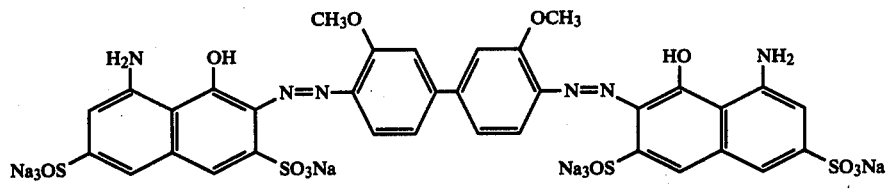

EXAMPLE 2

If the procedure indicated in Example 1 is followed and 1-amino-8-naphthol-2,4-disulphonic acid (Chicago acid SS) is employed as the coupling component, a solution is obtained if triethanolamine is employed as the base required, in addition to the calcium hydroxide, in order to complete the reaction.

EXAMPLE 3

18.62 g (0.2 mol) of aniline in 30 ml of water are stirred with 14.1 ml (0.1 mol) of sulphuric acid (40% Bé strength) and 20.3 ml (0.2 mol) of hydrochloric acid of 19.5 Bé strength and then diazotised dropwise (over the course of about 1 hour) at 0° C. (ice-sodium chloride mixture) with 13.2 g (0.1 mol) of Ca(NO₂)₂, dissolved in 25 ml of water. The aniline salts which have initially precipitated hereupon dissolve in the form of the benzenediazonium chloride whilst CaSO₄·2H₂O separates out as an insoluble precipitate. During the reaction, the mixture must always react acid to Congo Red. If necesa concentrated dyestuff solution being obtained.

Table

| Diazo component | Coupling component |
|---|---|
| ⌬—NH₂ | CH₃ group pyrazolone with SO₃H groups (2,5-disulfo) |
| CH₃—O—⌬—NH₂ | COOH group pyrazolone with SO₃H (4-sulfo) |

Table-continued

| Diazo component | Coupling component |
|---|---|
| 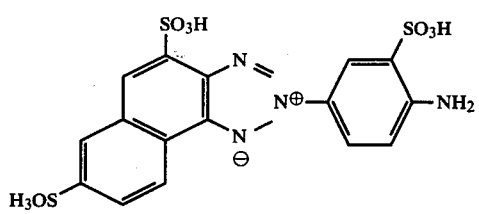 | |

EXAMPLE 6

100 g (0.2 mol) of the compound

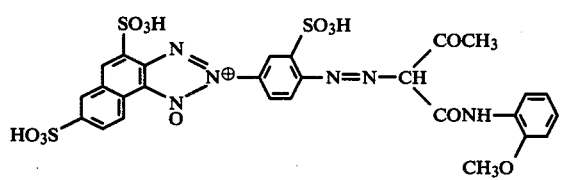

which has been prepared according to German Offenlegungsschrift (German Published Specification) No. 2,126,299, Example 1, are stirred into 380 ml of water and 17.6 ml (0.121 mol) of sulphuric acid of 40° Bé strength are added. 13.2 g (0.1 mol) of $Ca(NO_2)_2$ are introduced over the course of one hour. Stirring is continued for a further hour and the excess nitrous acid is destroyed with amidosulphonic acid. 41.4 g (0.2 mol) of finely ground acetoacetic acid o-anisidide are then sprinkled into the suspension and the pH is maintained at 4, initially by sprinkling-in of 2.0 g (0.02 mol) of $CaCO_3$ and then by adding triethanolamine (about 27 g). When the reaction has ended, the pH is adjusted to 6 by adding further triethanolamine, 150 g of urea are added and after heating to 60° C. the mixture is clarified by removing precipitated $CaSO_4·2H_2O$. An approx. 20% strength solution (expressed as free dyestuff-acid) of the dyestuff is obtained.

EXAMPLE 7

21.7 parts (0.1 mol) of 2-ethoxy-5-amino-benzenesulphonic acid are stirred with 80 parts of water and 40 parts of 27.9% strength hexafluosilicic acid. 60 parts of ice are added and 23.5 parts of 30% strength sodium nitrite solution are then added dropwise. After stirring for 15 minutes, the sodium fluosilicate which has precipitated is filtered off and the excess nitrite in the filtrate is destroyed with a little amidosulphonic acid.

24.7 parts (0.049 mol) of N,N'-carbonyl-bis-(6-amino-1-naphthol-3-sulphonic acid), as an approx. 40% strength moist paste, are stirred with 160 parts of water, warmed to 45° C. and dissolved by means of 40 parts of 25% strength ammonia solution. The abovementioned diazotisation solution is added and the reaction mixture is stirred for a further hour. A concentrated solution of the ammonium dyestuff salt is obtained.

We claim:

1. In a process for the preparation of concentrated aqueous or aqueous-organic solutions of low electrolyte content of azo or disazo dyestuffs containing sulfonic acid groups obtained by diazotization with sodium nitrite in the presence of sulfuric acid and by coupling, the improvement which consists essentially of performing the alkaline coupling reaction in the presence of calcium hydroxide whereby calcium sulfate is simultaneously precipitated and separated from the reaction medium and a concentrated solution of the resulting dyestuff is recovered.

2. Process according to claim 1, characterised in that dianisidine is bis-diazotised in the usual manner with sodium nitrite and sulphuric acid and that during the alkaline coupling with two equivalents of the compounds of the formula

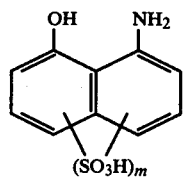

wherein m . . . 1 or 2 the sulphate ions are precipitated as calcium sulphate by adding calcium hydroxide, and the calcium sulphate is separated off.

* * * * *